United States Patent [19]
Scott et al.

[11] 3,815,653
[45] June 11, 1974

[54] TIRE CHANGING APPARATUS

[75] Inventors: Ray A. Scott; Fredrick R. Bossard; Elmer J. Strang; John L. Mikovits, all of Fort Dodge, Iowa

[73] Assignee: The Coats Company, Inc., Fort Dodge, Iowa

[22] Filed: Sept. 11, 1972

[21] Appl. No.: 288,154

[52] U.S. Cl............... 157/1.24, 157/1.26, 157/1.28
[51] Int. Cl............................................. B60c 25/06
[58] Field of Search ....... 157/1.22, 1.24, 1.26, 1.28, 157/1.3

[56] References Cited
UNITED STATES PATENTS

| | | | |
|---|---|---|---|
| 2,712,350 | 7/1955 | Henderson | 157/1.22 |
| 3,168,130 | 2/1965 | Turpin | 157/1.28 |
| 3,522,832 | 8/1970 | Held et al. | 157/1.22 |
| 3,556,193 | 1/1971 | Duquesne | 157/1.28 |

FOREIGN PATENTS OR APPLICATIONS

| 161,851 | 6/1954 | Australia | 157/1.24 |
|---|---|---|---|

Primary Examiner—Al Lawrence Smith
Assistant Examiner—Harold P. Smith, Jr.
Attorney, Agent, or Firm—Hofgren, Wegner, Allen, Stellman & McCord

[57] ABSTRACT

A tire changing apparatus adapted for use with a large variety of tires on rims having varying diameters and internal opening shapes and sizes. The apparatus includes a frame having a horizontal portion and a vertical portion with a tire and rim supporting table mounted for generally horizontal movement and for rotational movement about a generally vertical axis. The horizontal movement is in the direction of the vertical frame portion and the latter in turn mounts upper and lower bead breaking assemblies having a common actuator for moving the two towards each other to break both beads when a tire is on the table. Also included is a combination mounting and demounting tool which may be employed in connection with rotation of the table for mounting or demounting a tire on a rim. The apparatus provides the advantage of permitting bead breaking and tire mounting and demounting without removing a rim from the table and the capability to change tires on rims having a large variety of diameter widths and internal opening sizes.

13 Claims, 9 Drawing Figures

Fig. 1.

TIRE CHANGING APPARATUS

BACKGROUND OF THE INVENTION

This invention relates to tire changing apparatus of virtually universal application. In particular, there is disclosed an apparatus whereby tires may be changed for any of a variety of rim sizes from approximately 10 inches on up to 18 inches.

Tire changing apparatus currently employed in the United States virtually always employ a tire and rim receiving table whereon a tire may be clamped by means of a vertical spindle extending through the hub receiving aperture in the rim in connection with a hold down cone. While such apparatus is perfectly satisfactory for use with rims of American manufacture, frequently the use of an adaptor is required for rims of foreign manufacture as well as ornamental type rims such as so-called "mag" rims.

The difficulty arises in that a number of such rims do not have a hub receiving aperture of a size that lends itself to ready application to such equipment. The hub receiving apertures may either be too large or too small. Thus, additional effort is required in fitting an adaptor to either the table or the rim before the rim and tire are applied to the changing apparatus. This, of course, necessitates additional labor thereby increasing the cost of tire changing.

In order to overcome these difficulties, tire changing apparatus have been proposed wherein other means are employed to grip the rim of a tire for rotation. In general, such machines fall into two categories. The first includes those wherein upstanding lugs on a table are moved outwardly once a tire and rim have been located on the table to grasp the interior of the rim to hold the tire in place. This type of machine has as a major difficulty the fact that the nature of the grip to the rim provided by such lugs is such that only forces generally parallel to a plane encompassing the lugs are dissipated so that the bead on a tire cannot be satisfactorily broken while the tire and rim are on the table. Specifically, bead breakers typically apply a force to the tires having a component that can be dissipated by such lugs and one that is generally normal thereto which is generally sufficiently high as to cause the rim to slip off the lugs. Thus, with this type of machine, it has heretofore been necessary to break the beads on the tire before the same can be mounted on the table for mounting or demounting of the tire.

The second category of machine grips the rim from the exterior thereof. In order to obtain a satisfactory grip with such a machine, it again is necessary that the bead be broken before the same may be applied to the table. Moreover, it is difficult to inflate a tire after remounting while on the table inasmuch as the tire will inflate over the gripping portions and trap the same between the tire and the rim so that the tire cannot be readily removed from the changing table.

Moreover, such equipment is generally limited in terms of the number of rims of varying diameters that may be handled to those not substantially varying from the sizes employed on vehicles of American manufacture by reason of the bead breakers being relatively fixed in position with respect to the table center.

SUMMARY OF THE INVENTION

It is the principal object of the invention to provide a new and improved tire changing apparatus. More specifically, it is an object of the invention to provide a tire changing apparatus that may have virtually universal use with rims of all sizes and having a variety of internal openings and which may be employed with such rims without the need for a special adaptor.

The exemplary embodiment achieves the foregoing objects in a construction including a frame having both a generally horizontal lower portion and a vertical upstanding portion. Mounted on the horizontal portion is a tire changing table which is mounted for movement in a generally horizontal direction towards and away from the vertical frame portion and for rotation about a generally vertical axis.

The tire changing table includes upstanding, movable lugs and a power actuator therefor whereby the same may be moved into tight engagement with the interior of the rim of a tire placed on the table.

The apparatus includes upper and lower bead breaking assemblies mounted for movement on the vertical frame portion. A common operator is employed to drive the two towards each other in such a way that the upper bead breaking assembly will engage the tire prior to the lower bead breaking assembly. The upper bead breaking assembly also includes hold down arms to engage the upper surface of the rim thereby providing an effective resistant force in a direction non-parallel to the plane in which the tire holding lugs lie for resisting the forces applied to the tire and rim by the lower bead breaking assembly which would tend to cause the tire and rim to slip off the lugs.

The vertical frame portion also mounts a tool which may be selectively moved towards the rim for the purpose of mounting and demounting tires therefrom when the table is rotated and a power operator is employed for rotating the table for this purpose.

Means are provided whereby the horizontal location of the table with respect to the bead breaking assembly and the tool may be selectively varied to condition the apparatus for tire changing operations with rims having a large variety of sizes as, for example, rims having diameters in the range from 10 to 18 inches.

The system also includes a linkage automatically responsive to upward movement of the upper bead breaker assembly away from the tire for swinging the lower bead breaking assembly out of proximity of the table prior to rotation of the same for tire demounting purposes.

The invention also contemplates an improved bead lubricating system automatically positionable with the tool.

Other objects and advantages will become apparent from the following specification taken in conjunction with the accompanying drawings.

DESCRIPTION OF THE PREFERRED EMBODIMENT

Figure 1:
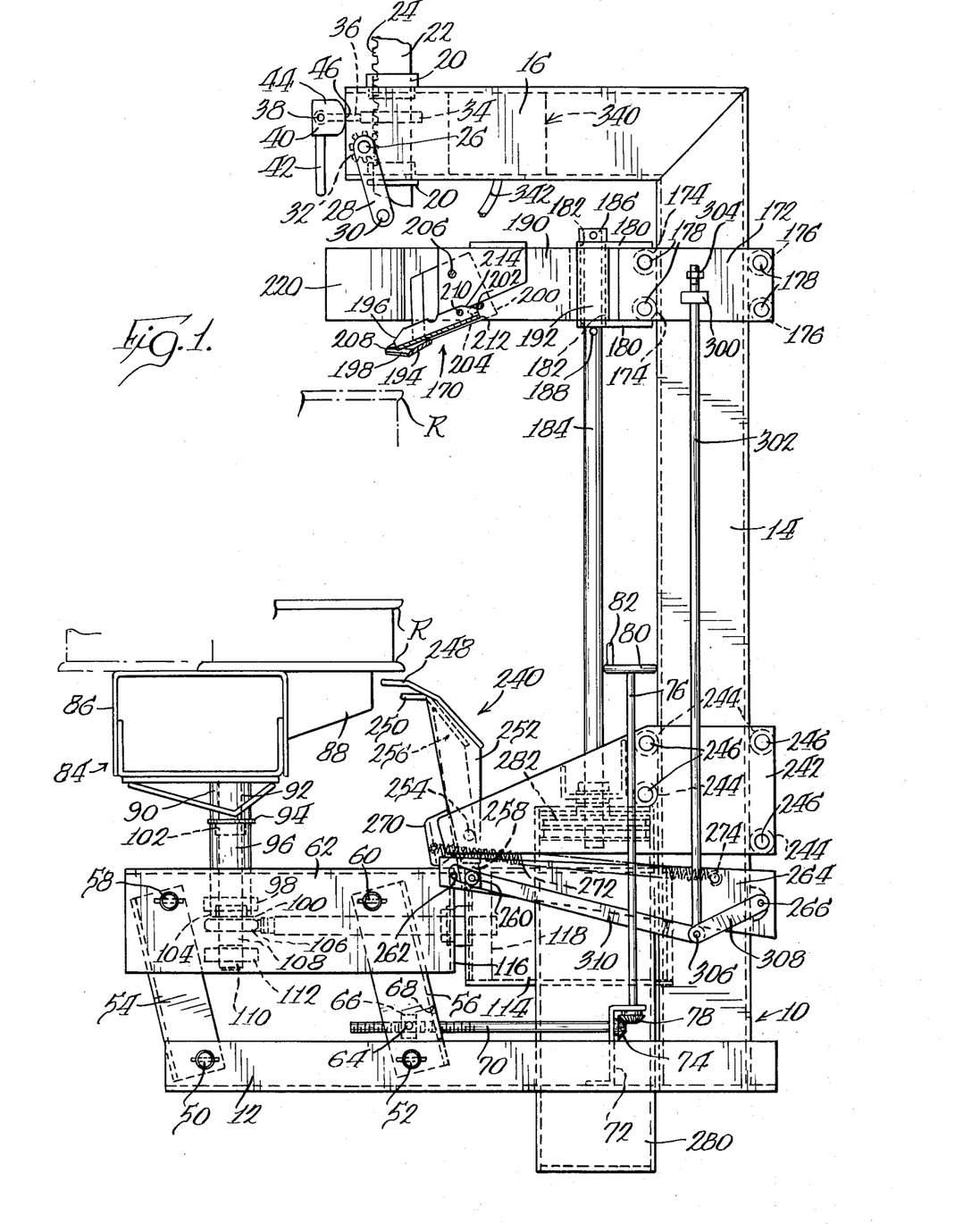
FIG. 1 is a side elevation of a tire changing apparatus embodying the invention.
Figure 2:
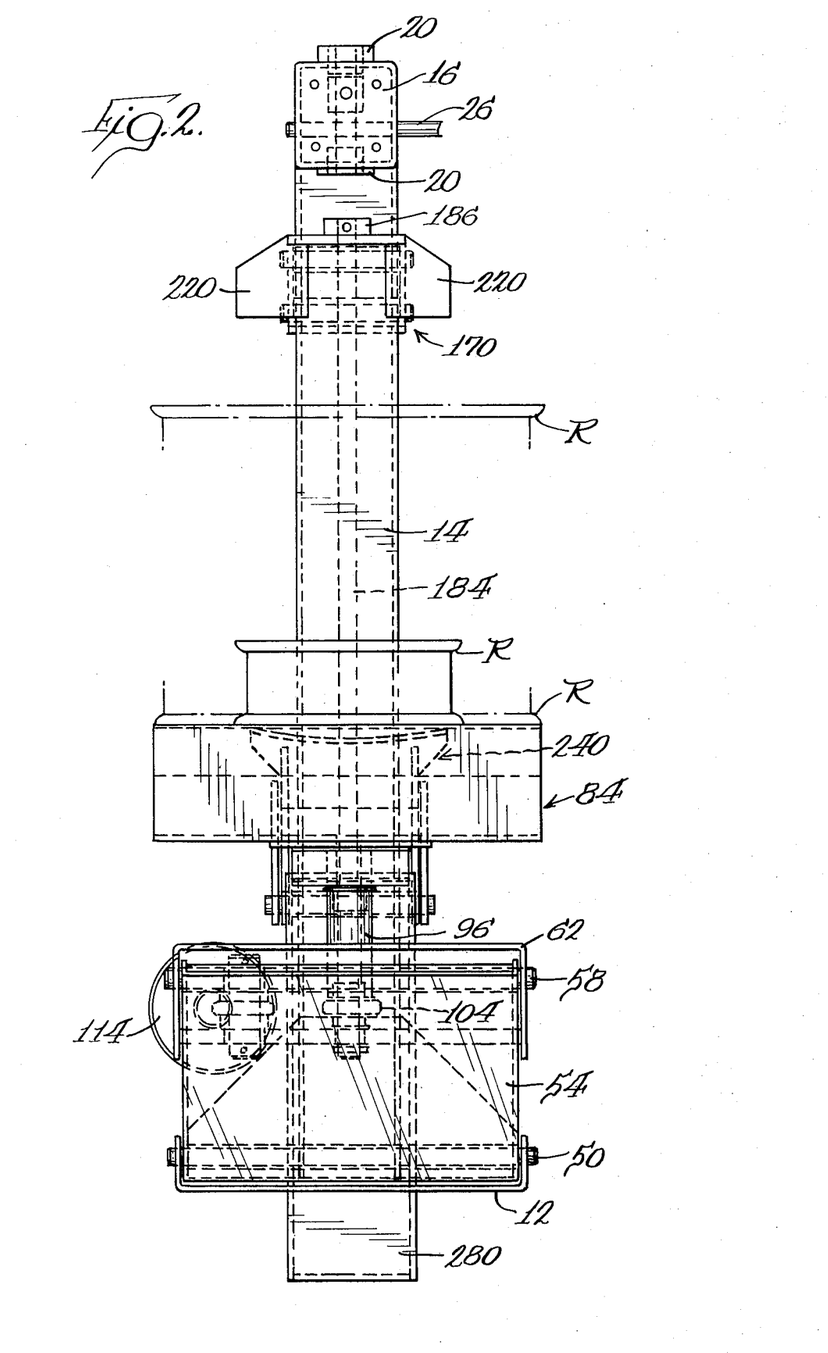
FIG. 2 is a front elevation of the apparatus with certain elements omitted for clarity.

An exemplary embodiment of a tire changing apparatus made according to the invention is seen in FIGS. 1 and 2 and includes a frame, generally designated 10, having a lower, horizontal portion 12 and an upstanding, generally vertical portion 14. The horizontal frame portion 12 may be formed of plate having upturned sides for rigidity and feet (not shown) may be applied to the undersurface thereof to mount the same in an elevated position above a supporting surface. Suitable control valves (not shown) for operating various components are secured to the underside of the horizontal frame portion 12 and may include foot operated manual actuators.

The vertical frame portion 14 is preferably formed of tube stock having a rectangular configuration, normally square, and at its upper end, mounts a horizontally extending tool support arm 16 for supporting a combination tool which may be applied to a tire and rim for mounting or demounting a tire and formed of similar tube stock.

The outboard end of the arm 16 includes upper and lower bushings 20 which slidably receive a generally cylindrical shaft 22 having rack defining teeth 24 on one side thereof. Opposite walls of the arm 16 journal a shaft 26 which emerges on one side of the arm 16 to be fixedly connected to a crank arm 28 having an operating handle 30. Within the interior of the arm 16 and fixedly secured to the shaft 26, is a gear 32 in mesh with the gear teeth 24. Thus, by rotating the crank 28, the vertical attitude of the shaft 22 may be regulated. As will be seen, the lower end of the shaft 22 mounts a combination tire mounting and demounting tool and the provision of the crank allows selective adjustment of the tool for rims having various widths.

Also provided in connection with the tool is a lock for the shaft 22 whereby the latter can be locked in a desired position of adjustment. In particular, within the arm 16, a sleeve 34 surrounds the shaft 22 and includes an outwardly extending link 36 which extends exteriorly of the end of the arm 16 to receive a pivot pin 38. The pivot pin 38 is also connected to a bifurcated, yoke-like half oval shaped element 40 having a depending handle 42. The arrangement is such that the pivot pin 38 is located a shorter distance from the upper side 44 of the element 40 than from the end 46 thereof to define a toggle arrangement. As a result, when the handle 42 is rotated clockwise to a position 90° from that shown, the sleeve 34 will be free to move to the right as seen in FIG. 1, while in the position shown, it is pulled to the left to tightly grasp the side of the shaft 22 opposite the rack teeth 24 to provide a frictional lock for the shaft 22.

Returning now to the horizontal frame portion 12, the same includes, at spaced locations, first and second pivots 50 and 52 which extend through the lower ends of respective channel-shaped plates 54 and 56. The upper ends of the channel-shaped plates 54 and 56 are connected via pivots 58 and 60 to an inverted, box-shaped subframe member 62. It will be recognized that the resulting assemblage defines a parallelogram linkage whereby the subframe member 62 may be shifted toward and away from the vertical frame portion 14 while having its upper surface remain in a substantial horizontal plane.

Means are provided for selectively varying the position of the subframe member 62 with respect to the vertical frame portion 14 and, as illustrated in FIG. 1, include a pivot 64 for a nut 66 located between the legs of the channel 56. The base of the channel 56 includes an aligned opening 68 and a threaded shaft 70 extends therethrough to impale the nut 66. The opposite end of the shaft 70 is passed through an S-shaped supporting bracket 72 secured to the horizontal frame portion 12 by any suitable means to be connected to a bevel gear 74. Of course, suitable bearings will be employed.

The upper end of the bracket 72 journals a vertically extending shaft 76 having its lower end terminating in a bevel gear 78 and in engagement with the bevel gear 74. The upper end of the shaft 76 is supported and journalled for rotation by any suitable means (not shown) and terminates in a hand wheel 80 having a gripping knob 82. It will be thus appreciated that by rotation of the hand wheel 80, the subframe 62 may be moved toward or away from the vertical frame portion 14 depending upon the direction of such rotation.

The subframe 62 mounts a tire receiving table, generally designated 84. The same is basically comprised of a tubular frame work 86, formed of plural members to define a housing for tire rim gripping elements and an actuator therefor, and a relieved extension 88 to be described in greater detail hereinafter.

Affixed to and depending from the underside of the tubular housing 86 is a sleeve 90 connected to an elongated shaft 92. At the lower end of the sleeve 90 is a washer-like thrust bearing 94 which is seated on a sleeve 96 through which the shaft 92 extends for rotation therein.

The sleeve 96 extends through an opening (not shown) in the upper surface of the subframe 62 and is supported therein by a laterally extending bracket 98. At the lower end of the sleeve 96 and just below the bracket 98, a bearing 100 is provided while a similar bearing 102 is provided at the upper end of the sleeve 96.

The shaft 92 extends beyond the lowermost extremity of the sleeve 96 to pass through a washer-like thrust bearing 104 to be fixedly secured to a sprocket 106. A further extension of the shaft 92 below the sprocket passes through a spacing sleeve 108 into a bearing 110 which is supported by laterally extending cross bracket 112 generally similar to the bracket 98.

As a result of the foregoing, it will be appreciated that the table 84 is mounted for rotation about a generally vertical axis coextensive with the elongated axis of the shaft 92.

Figure 4:
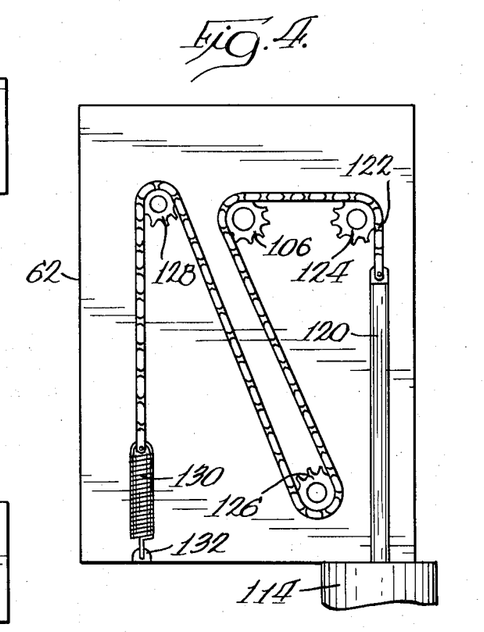
FIG. 4 is a schematic of a system for rotating the tire supporting table.

Means are also provided for rotating the table 84 about the vertical axis. With reference to FIGS. 1, 2 and 4, the table rotating means will be described. In particular, there is provided a single-acting cylinder 114 which is affixed by a suitable fixture 116 to the subframe 62 for movement therewith. The cylinder 114 includes a piston 118 and a piston rod 120 connected thereto and extending through the fixture 116 into the subframe 62. The end of the rod 120 remote from the cylinder 114 is connected to a chain 122 which is passed about an idler sprocket 124 journalled within the subframe 62. The arrangement is such that the chain 122 encounters the sprocket 124 in a direction coextensive with the elongated axis of the piston rod 120 to minimize side stresses thereon.

From the sprocket 124 the chain 122 is passed about the sprocket 104 on the lower end of the table rotating shaft 92. From the sprocket 104, the chain is then taken to a suitably journalled idler sprocket 126 and a further idler sprocket 128 to one end of a spring 130. The other end of the spring 130 is affixed, as by a tongue 132, to any suitable portion of the subframe 62.

Air under pressure may be selectively applied to the left-hand side of the piston 118 via any suitable valve, and preferably a foot-operated valve as generally alluded to previously. From the foregoing, it will be appreciated that when the piston 118 is moved to the right, as viewed in FIG. 1, the chain 122 will be pulled about the various sprockets against the resistance offered by the spring 130. This will, in turn, result in rotation of the sprocket 104 and thus the table 84. The length of stroke of the piston 118 and the number of teeth in the sprocket 104 are chosen such that at least about 180° of rotation of the table 84 will occur to insure complete mounting or demounting, as the case may be.

When pressure against the left-hand side of the piston 118 is released, the spring 130 will return the table 84 to its initial starting position as viewed in FIG. 1.

In order to insure smooth action, it is preferable that the space within the cylinder 114 and the right-hand side of the piston 118 be connected through a suitable metering orifice and a flexible conduit (not shown) to the interior of the vertical frame portion 14 and filled with a hydraulic fluid. Thus, during such movement, fluid is forced through the metering orifice limiting the maximum rate of movement of the piston 118 and into the vertical frame portion 14 which serves as a reservoir for the coil. When the reverse action takes place, oil from the reservoir will return to within the cylinder 114, again through the orifice thereby limiting the rate of return of the table 84 to its original position.

Figure 3:
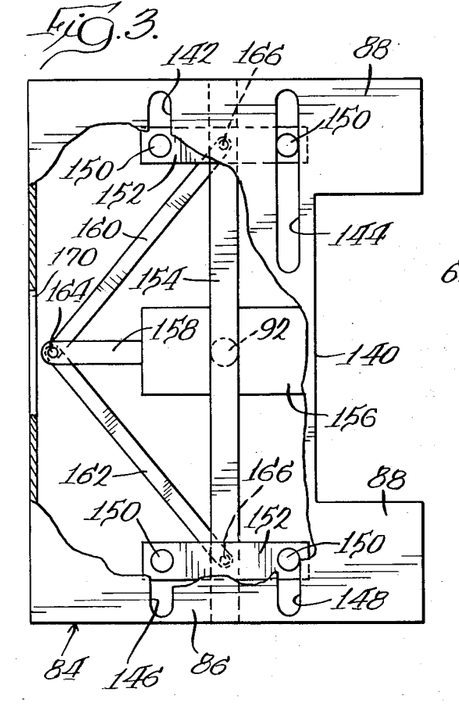
FIG. 3 is a plan view of the tire supporting table employed in the apparatus.

Turning now to FIG. 3, the table 84 and the rim holding means employed therein will be described in greater detail. In particular, it will be seen that table extension 88 includes a relieved portion 140, the purpose of which is to permit the lower bead breaking assembly to closely approach the axis of rotation of the table defined by shaft 92 for the purpose of permitting tire changing on extremely small rims. That is, the lower bead breaking assembly can, depending upon how closely the table 84 is positioned to its rightmost position, as viewed in FIG. 1, pass through the relief 140 to engage the tire sidewall.

The housing 86 of the table 84 includes four slots 142, 144, 146 and 148 in its upper surface. The slots 142–148 are generally located about the shaft 92 as indicated, and extending through each slot to a position above the upper surface of the housing 86 of the table 84 are knurled rim gripping lugs 150. One set of diagonally opposite lugs 150 may be non-rotatable, while the opposite set preferably are rotatable.

Pairs of the lugs 150 are supported by respective mounting bars 152. That is, two mounting bars 152 are provided and the same are located within the housing 86 of the table 84. Extending along the length of the table 84 and within the housing 86, is a cylindrical guide shaft 154 and the mounting bars 152 are impaled thereon for slidable movement relative thereto. Thus, the guide shaft 154 mounts the mounting bars, and thus the lugs 150, for movement of the latter within the slots 142–148.

Also mounted within the housing 86 of the table 84 is a double acting cylinder 156 having a piston rod 158 extending therefrom. Extending from the end of the piston rod 158 remote from the cylinder 156, are connecting links 160 and 162. Each of the links 160 and 162 has one end pivotally connected by a pivot pin 164 to the piston rod 158 while having their opposite ends connected by a pivot 166 or 168 to respective ones of the mounting bars 152.

The leftmost side of the housing 86 of the table 84 includes side opening 170 so as to provide some measure of clearance for the links 160, 162 and the piston rod 158 when the same is extended to its full extreme position.

Suitable valve means (not shown) preferably foot operated, are employed for controlling the application of air under pressure to the cylinder 156 to cause extension or retraction of the rod 158.

From the foregoing, it will be appreciated that when the piston rod 158 begins to retract from the cylinder 156, the guide bars 152, and thus the lugs 150, will move away from the axis of rotation of the table 84 defined by the shaft 92. When a rim has been placed on the table, the lugs 150 will move outwardly until such time as they engage the inner periphery of the rim edge to tightly hold the same in place on the table. It will also be recognized that by reason of the provision of rotatable lugs in some instances, as well as the overall geometry of the system, that the system is self-centering in terms of locating the rim precisely centered above the axis of rotation of the table.

Extension of the rod 158 will result in the lugs 150 moving inwardly to release a rim on the table.

Figure 5:
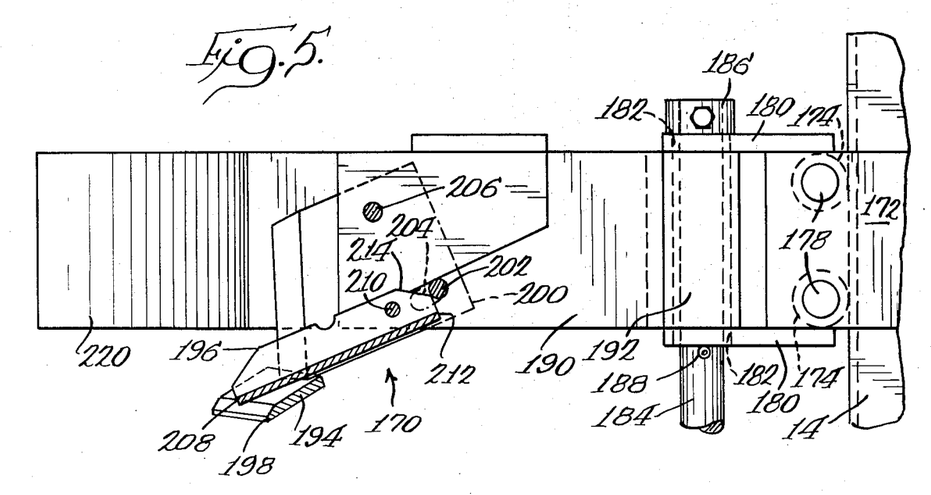
FIG. 5 is an enlarged view of an upper bead breaking assembly.

Returning now to FIG. 1 and also with reference to FIG. 5, an upper bead breaker assembly, generally designated 170, will be described. Opposed plates 172 (only one of which is shown) sandwich the vertical frame portion 14, and extending between the plates 172 are a plurality of rollers 174 and 176 journalled for rotation relative to the plates 172 by shafts 178 extending between the plates 172. AS can be seen, the rollers 174 embrace one side of the vertical frame portion 14 while the rollers 176 embrace the opposite side thereof thereby providing a carriage that may move vertically on the vertical frame portion 18.

Connected to the upper and lower extremities of the plates 172 adjacent the rollers 174, are horizontally extending plates 180 having aligned apertures 182 therein. A piston rod 184 extends upwardly through the apertures 182 to be connected to a retaining sleeve 186 just above the uppermost one of the plates 180. A lower, retaining pin 188 extends through the piston rod 184 just below the lowermost plate 180 so that the carriage defined by the plates 172 is affixed to the piston rod 184 to be moved thereby in a vertical direction.

Between the plates 180 there is located a horizontally extending arm 190 terminating at its rightmost end in a sleeve 192 through which the piston rod 184 also passes. This construction permits the arm 190 to be rotated about a vertical axis defined by the piston rod 184 for purposes to be seen.

At the leftmost end of the arms 190 there is provided a bead breaker 194 and a blocking pawl 196 therefor. The bead breaker 194 has an arcuate curved bead breaking edge 198 which is secured as by welding to a pair of arms 200, one on each side of the arm 190. Extending between the two arms 200 is a pin or shaft 202 and the same is located in an arcuate slot 204 within the arm 190. In addition, a shaft 206 near the upper ends of the arms 200 mounts the same and thus the bead breaker 194 for pivotal movement on the end of the arm 190 about a horizontal axis.

The blocking pawl 196 includes an end 208 that extends inwardly towards the table 84 past the bead breaking edge 198 of the bead breaker 194. In addition, the pawl 196 is pivotally mounted to the arms 190 by a pivot 210. The end of the pawl 196 opposite the end 208, includes a flat blocking surface 212 and a relieved surface 214. Normally, pawl 196 will generally be in the attitude shown with respect to the bead breaker 194 with the result that the blocking surface 212 will be in abutment with the pin 202 thereby precluding the pin 202 from moving downwardly within the slot 204. This insures that the bead breaking surface 198 will be oriented in a position just to the exterior of an underlying rim as the bead breaker assembly 170 is lowered as will be seen.

At some point in such movement, the end 208 of the pawl will engage the rim with the result that the pawl 196 will be pivoted in a clockwise direction about shaft 210 so that the pin 202 will no longer be blocked by the blocking end 212. Rather, it will be free to move downwardly within the slot 204 by reason of the provision of the relieved surface 214. At this point in time, the bead breaking edge 198 will underlie the upper edge of the rim and continued downward movement of the bead breaking assembly 170 will cause the arm 200 to pivot in a clockwise direction about pivot 206 with the result that the bead breaking surface 198 will be forced inwardly and under the rim flange to break the bead thereat.

When the upper bead breaker assembly is moved out of engagement with the rim, gravity will return the bead breaker and the blocking pawl to the position illustrated.

Also included with the bead breaking assembly 170 is a pair of outwardly extending, arcuate hold down arms 220, which are configured in such a way that the undersurface thereof will engage the upper surface of a rim on the table at about the time the upper bead has been broken to firmly clamp the rim against the upper surface of the table 84. As will be seen, this precludes a rim and tire twisting off the table during operation of the lower bead breaking assembly and thereby allows the tire changing apparatus of the invention to break beads and mount and demount tires without removing the tire from the table. Preferably, rubber pads (not shown) are secured to the undersides of the hold down arms 220 to preclude metal to metal contact with a rim.

FIG. 1 also illustrates a lower bead breaking assembly, generally designated 240. Plates 242 sandwiched about the vertical frame portion 14 in connection with rollers 244 and shafts 246 define a carriage generally similar to that described previously in connection with the description of the upper bead breaker 170.

At the extreme inward end of the plates 242 there are provided upper and lower bead breaking shoes 248 and 250, respectively. As is well-known, the upper and larger shoe 248 flexes the sidewall of a tire sufficiently so as to allow the lower shoe 250 to enter between the flange of the rim and the innermost extent of the tire to unseat the bead from the rim.

The upper shoe 248 is supported by a pair of depending legs 252 which are received on a pivot pin 254 extending between the plates 242 and such that the legs 252 are interior of the carriage defined by the plates 242.

The lower shoe 250 is also supported by a pair of legs 256 which are journalled on the pin 254 such that the legs 256 are interior of the legs 252. In addition, the legs 256 include a downward extension 258 between which a shaft 260 extends. The shaft 260 extends beyond the extremity of the leg extensions 258 to be received in elongated slots 262 (only one of which is shown) in guide arms 264 (only one of which is shown) having their opposite ends journalled by a fixed pivot 266. The slots 262 thus control or guide the pivoting of the legs 256 about pivot 254 and thereby guide the lower shoe 256 into a proper orientation with respect to a tire on a rim supported by the table 84.

Returning to the legs 252, one of the same, at a point below pivot 254, includes an apertured tab 270 for receipt of one end of the spring 272 and which extends to the side sufficient to clear the adjacent guide arm 264. The opposite end of the spring 272 is fixed to any portion of the frame as by a pin 274. As a result of the foregoing construction, it will be appreciated that the upper shoe 248 is biased in a counterclockwise direction by the spring 272 and since the upper shoe 248 overlies the lower shoe 250 and is in interference relationship therewith, the lower shoe 250 will be biased in a counterclockwise direction as well. The purpose of this construction is to normally bias the two shoes 248 and 250 into an operative position which is determined by the position of the slot 262 and, specifically, the right-hand end thereof in relation to the shaft 260. In other words, the right-hand end of the slot 262 serves as a stop against which the shaft 260 abuts as well as being used for guide purposes.

Adjacent the vertical frame portion 14 is a double acting cylinder 280 having a piston 282 to which the piston rod 184 is connected. The cylinder 280 is connected by any suitable means to the carriage defined by the plates 242 and is movable therewith. As a result of the foregoing, it will be appreciated that when the piston 282 has fluid under pressure applied thereto in such a way as to retract the rod 184, the upper bead breaker assembly 170 will be drawn downwardly. At this time, the lower bead breaking assembly 240 will not be moved upwardly since the weight of the assembly 240 and the cylinder 280 is such that the assembly 240 will remain at its lowermost position until a substantial resistance is encountered by the upper bead breaking assembly 170 in the course of its downward movement.

Such resistance occurs when the hold down arms 220 seat against the upper edge of the rim on the table 84. Thus, with the rim firmly clamped against the table, not only by the lugs 150, but by the hold down arms 220, only then will the lower bead breaking assembly 240 be elevated to engage the tire to break the lower bead. Thus, by this construction, there is virtually no possibility that a tire can be twisted off the table by reason of the application of forces thereto by a lower bead breaking assembly in a direction not parallel to the plane encompassing the tire holding lugs.

Extension of the rod 184 will initially lower the lower bead breaking assembly and then raise the upper bead breaking assembly 170. Suitable valve means, again preferably foot operated, are employed to control application of air under pressure to the cylinder 280.

FIG. 1 also shows a safety feature to insure damage will not occur to the lower bead breaking assembly 240 by reason of interference with the table 84 when the latter is rotated. In particular, one of the plates 172 defining the carriage for the upper bead breaking assembly 170, includes an outwardly projecting, apertured ear 300 through which an elongated link 302 slidably extends to be captured by any suitable retaining means such as a nut 304 or a cotter pin. The lowermost end of the link 302 is pivotally joined by a pin 306 to adjacent ends of links 308 and 310. The opposite end of the link 308 may be connected to any suitable pivot point as, for example, the pivot point 266, while the remote end of the link 310 is pivotally connected to the shaft 260. In addition, the sum of the lengths of the links 308 and 310 is greater than the distance between the pivot 266 and the shafts 260 when the shoes 248 and 250 are biased to their normal position.

Thus, it will be appreciated that when the upper bead breaker assembly 170 is moved upwardly, which is a necessary preliminary to a tire mounting or demounting operation requiring rotation of the table 84, as it approaches the uppermost limit of its movement, the ear 300 will engage the underside of the nut 304 so that continued movement will move the link 302 upwardly. This will, in turn, move the pivot point 306 upwardly, and since the pivot 266 is fixed, shaft 260 is necessarily forced to the left or in a clockwise direction about the pivot point 264 to thereby pivot the upper and lower shoes in a clockwise direction and against the bias of the spring 272 to a position remote from the table 84. Thus, when the table 84 is rotated during a mounting or demounting operation, it cannot encounter the shoes 248 and 250 to eliminate the possibility of damage to such components. Of course, when bead breaking is to be performed, the lowering of the upper assembly 170 will allow the spring 272 to return the shoes 248 and 250 to their operative position.

Figure 6:
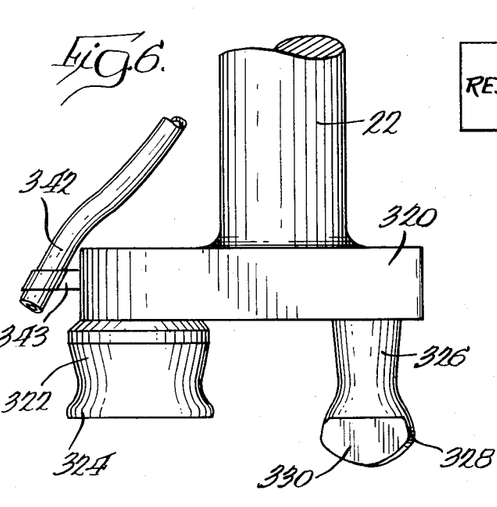
FIG. 6 is a front elevation of a combination tire mounting and demounting tool employed with the invention.
Figure 7:
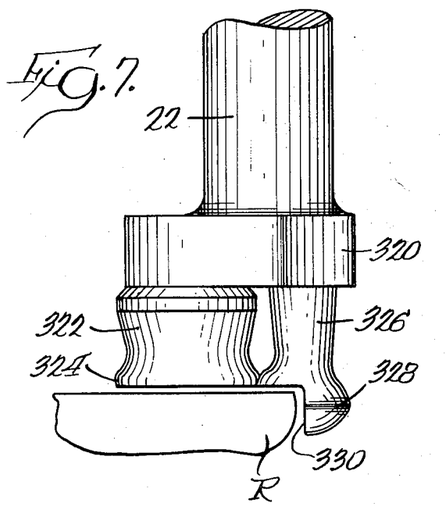
FIG. 7 is a side elevation of the tool.

Turning now to FIGS. 6 and 7, the combination mounting and demounting tool will be described in greater detail. In particular, the lower end of the shaft 22 (FIG. 1) terminates in a transversely extending plate 320 which is generally oriented in such a way as to define a chord across an arc constituting a minor fraction of the periphery of a rim on the table 86 when the table has been shifted to the desired position relative to the bead breakers which, in turn, is dependent upon rim diameter. One end of the plate 320 rotatably mounts a bell-shaped roller 322 having a flat undersurface and which is located to overlie the edge of the rim. That is, a portion of the roller 322 will be within the periphery of the rim while a portion will be outside of the rim periphery. The lower end of the roller 322 terminates in a lip 324 which is adapted to engage and hold the underside of the bead above the rim during a mounting process. In addition, the underside of the roller 322 is adapted to hold down a bead during the demounting process by engaging the upper surface thereof.

The opposite end of the plate 320 mounts a downwardly extending projection 326 having a bulbed head 328 provided with a notch or relief 330. As can best be seen in FIG. 7, the relief 330 is configured to be in close proximity to the edge of a rim R when the tool is in position.

In this regard, it is to be noted that the vertical surface of the relief 330 lies essentially in the wall of a vertical cylinder defined by the arcs of the edge 198 of the upper bead breaker 194 and the upper shoe 248 of the lower bead breaker assembly 240 when in the position shown in FIG. 1 for all positions of vertical adjustment of the tool. Thus, once the table 84 is properly positioned through the use of the hand wheel 80, both bead breaking assemblies and the tool will be properly oriented with respect to the edges of a rim on the table to allow bead breaking, demounting and mounting without further adjustment of the table.

The upper side of the bulbed head 328 is operative to engage the underside of a bead during the demounting process while the underside of the head 328 is adapted to engage the upper surface of the bead during the mounting process. During either process, the direction of table rotation 84 is such that the tire to be mounted or demounted will first encounter the roller 322 and then encounter the projection 326 and make the transition about the edge of the rim between the two.

Thus, the combination tool is useful for both mounting and demounting operations, thereby providing for an effective apparatus in that the tool need not be changed between the mounting and demounting processes.

A lubricating system for use during the tire changing operation will now be described with reference to FIGS. 1, 8 and 9. With reference specifically to FIG. 1, the tubular arm 16 may house the lubricating system, generally designated 340, consisting principally of a reservoir, a control system and a flexible lubricant delivery tube 342. The tube 342 extends exteriorly from the arm 16 and may be connected to the plate 320 on the shaft 22 by a bracket 343 (FIG. 6). The tube 342 terminates in a nozzle or the like (not shown) which is directed at the interface of the rim R in the tire sidewall for lubricating purposes just forwardly of the roller 322.

Figure 8:
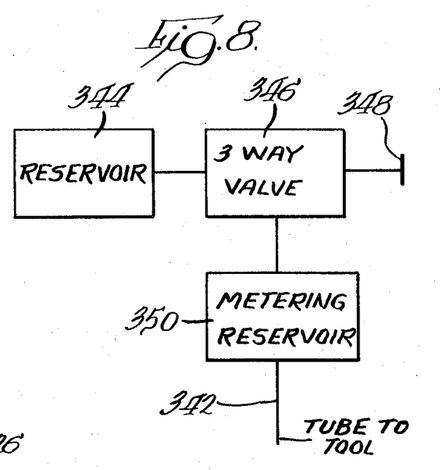
FIG. 8 is a schematic of a lubricating system employed in the invention.

With reference now to FIG. 8, the lubricating system 340 may include a reservoir 344 which may be wholly housed within the arm 116. The reservoir 344 is, in turn, connected to a valve 346 as, for example, a three-way valve, having a manual actuator 348 exteriorly of the arm 116. The three-way valve 346 is operative to establish fluid communication between the reservoir 344 and a metering reservoir 350 of limited capacity, generally on the order of a few milliliters. The metering reservoir in turn is connected to the tube 342.

The system in FIG. 8 is a gravity feed arrangement whereby when the actuator 348 is, for example, depressed, fluid will flow from the reservoir 344 under the influence of gravity to the metering reservoir 350 which is located below the main reservoir 344. From the metering reservoir 350, the lubricant will then flow through the tube 342 to be directed to the interface of the rim and the tire described previously, assuming that the shaft 22 has been lowered so that the tool is approximately in the position illustrated in FIG. 7. In normal operation, once the tool is properly positioned, the operator will momentarily depress the operator 348 to connect the reservoir 344 to the reservoir 350 to fill the latter. Upon release of the operator 348, the three-way valve 346 will vent the metering reservoir to atmosphere to allow the liquid therein to flow through the tube 342 to the point of use. Of course, if desired, the operator 348 could be linked to the control system for the cylinder 114 which is operative to rotate the table 84 which is the only time when the lubricant is required.

Figure 9:
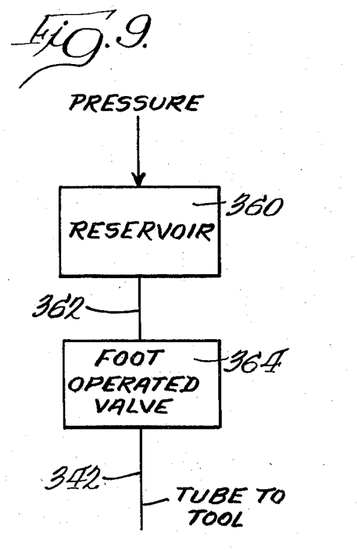
FIG. 9 is a schematic of a modified lubricating system.

An alternative pressurized system is illustrated in FIG. 9. In the system illustrated in FIG. 9, a reservoir 360 is provided for holding the lubricant, and pressure from any suitable source as, for example, the typical air pressure employed in tire changing apparatus, is applied thereto to pressurize the lubricant therein. A line 362 connects the reservoir 360 to a valve 364, which in turn connects to the tube 342. Preferably, the valve 364 is connected to a foot pedal or operator for the cylinder 114 for the same reasons set forth above. Thus, when the table 84 is rotated during a mounting or demounting operation, lubricant will automatically be fed under the influence of pressure from the reservoir to the point of use. In a system such as that shown in FIG. 9, it may be desirable to employ a spray nozzle to insure even distribution of the lubricant at the interface of the rim and the tire sidewalls.

The operation of the apparatus is generally as follows. Initially, the hand wheel 80 will be rotated to properly locate the table 84 with respect to the bead breaking assemblies and the combination tool. The final position will, of course, be dependent upon the diameter of the rim of the tire to be changed.

Either just prior to such adjustment or following such adjustment, the rim and tire are located on the table. Thereafter, the cylinder 156 is operated to retract its rod 158 so that the lugs 150 firmly engage the inner periphery of the rim and center the same on the table 84.

With the rim and tire firmly centered and held in a desired location with respect to the bead breakers, the cylinder 280 may then be energized. This will result in the upper bead breaking assembly 170 being lowered until the upper bead is broken and the hold down arms have firmly clamped the rim in place on the table. At this time, the continued energization of the cylinder 280 will result in upward movement of the lower bead breaking assembly 240 and, in turn, the breaking of the lower bead.

Thereafter, the cylinder 280 is operated to move the upper bead breaker upwardly and the lower bead breaker downwardly. Near the extreme position of such movement, the linkage including the links 302, 308 and 310 will pivot the shoes 248 and 250 away from the table 84 preliminary to a demounting operation.

Once the upper bead breaking assembly 170 has reached its uppermost position, it may be pivoted about its vertical pivot axis defined by the piston rod 184 to a position completely out of the way of the shaft 22. The shaft 22 may then be lowered to bring the tool approximately to the position illustrated in FIG. 7, whereupon a conventional bar or the like is employed to force the bead to a position above the head 328 of the projection 326. At this point, the cylinder 114 may be energized to rotate the table 84 to free the upper tire bead from the rim. Once the upper tire bead has been freed from the rim, the cylinder 114 may be de-energized to return the table to its initial position and the operation repeated on the lower bead to completely free the tire.

The tool may then be retracted by elevating the shaft 22 sufficiently so that a new tire may be applied to the rim. At this point, the tool may again be lowered and the lower bead of the tire oriented to be below the head 328 of the projection 326 and above the lip 324 of the roller 322. Thereupon, the cylinder 114 may be energized to rotate the table to fit the lower bead about the rim.

The table may then be returned to its initial position and the operation repeated to capture the upper tire bead within the rim. Thereafter, the beads may be seated and the tire inflated in a conventional way with the rim still secured to the table.

From the foregoing, it will be appreciated that apparatus made according to the invention provides extreme flexibility in terms of permitting the conducting of all tire changing operations with the rim firmly affixed to the table and provides flexibility in handling of a vast variety of rims of different diameters and rims having different internal openings. Thus, tire changing processes are made extremely efficient through use of an apparatus made according to the invention to minimize labor and expense.

We claim:

1. In a tire changing apparatus, the combination comprising: a main frame having a lower, horizontal portion and an upright vertical portion; a tire supporting table; means mounting said tire supporting table on said frame above said lower horizontal frame portion for movement toward and away from said vertical frame portion; means for selectively moving said table toward and away from said vertical portion; means on said table for gripping the rim of a tire placed thereon; an upper bead breaking assembly mounted for generally vertical movement on said vertical frame portion; a lower bead breaking assembly mounted for generally vertical movement on said frame and interposed between said table and said vertical frame portion; a common actuator for moving said upper and lower bead braking assembly towards and away from each other; and rim hold down arms extending from said upper bead breaking assembly and movable therewith for holding said rim against said table to resist vertical components of forces directed to a tire on said table by said lower bead breaking assembly.

2. The tire changing apparatus of claim 1 wherein said means for holding a rim on said table comprise a plurality of lugs extending upwardly from said table and movable thereon to grip the interior of the rim of a tire; and means for moving said lugs into tight engagement with the interior of the rim of a tire on said table.

3. Apparatus according to claim 2 wherein said table is mounted for rotational movement about a substantially vertical axis and wherein said vertical frame portion mounts a selectively operable tool movable into engagement with a tire and rim on said table for mounting and demounting a tire from the rim when said table is rotated.

4. Apparatus according to claim 2 wherein said table is mounted for rotational movement about a substantially vertical axis whereby a tool may be applied to a tire and rim on the table for mounting and demounting a tire.

5. Apparatus according to claim 4 further including means responsive to upward movement of said upper bead breaking assembly away from a tire on said table for swinging said lower bead breaking assembly away from said table to preclude interference between said lower bead breaking assembly and said table when said table is rotated.

6. In a tire changing apparatus, the combination comprising: means defining a frame; means defining a tire and rim supporting table; means rotatably mounting said table on said frame; a tire mounting and/or demounting tool; means mounting said tool on said frame for movement toward and away from said table to and from a tire engaging position whereby said tool may be employed to remove or replace a tire on a rim on the table when the table is rotated; and lubricating means for lubricating a tire and rim including a lubricating outlet movably mounted with said tool whereby said outlet may direct lubricant toward the interface of a tire and a rim when said tool is in said tire engaging position.

7. Apparatus according to claim 6 wherein said lubricating means includes a reservoir for holding a supply of a lubricant, and means associated with said reservoir for metering a predetermined amount of lubricant; and wherein said lubricant outlet is at the end of a flexible conduit connected to said metering device.

8. Apparatus according to claim 7 further including manually operable means for directing lubricant from said reservoir to said metering means.

9. Apparatus according to claim 7 further including a valve operatively interposed between said metering means and said reservoir.

10. Apparatus according to claim 6 wherein said lubricating means includes a reservoir for receiving a supply of lubricant and said lubricant outlet is at the end of a flexible conduit connected to said tool; valve means interposed between said reservoir and said lubricant outlet; means for rotating said table; and means responsive to the operation of said table rotating means for opening said valve to allow lubricant to flow to said lubricant outlet.

11. Apparatus according to claim 10 wherein said reservoir is adapted to be connected to a source of fluid under pressure.

12. In a tire changing apparatus, the combination comprising: means defining a frame; means defining a table adapted to receive a tire and rim; means on said table for frictionally gripping the interior edge of a rim to hold the same on the table; upper and lower bead breaking assemblies movably mounted on said frame for movement between upper and lower bead breaking positions respectively relative to said table and respective positions remote from said table, said upper and lower bead breaking assemblies being aligned with each other and movable between said positions in substantially a single path; and means mounting said table on said frame for movement toward and away from said path whereby said table, and thus a tire and rim supported thereon, may be properly aligned with said bead breaking assembly, whereby said apparatus may be employed to break the beads on tires and rims having a large variety of rim diameters and internal rim opening configurations, said apparatus further including hold down arms operatively associated with said upper bead breaking assembly and movable therewith to a clamping position in engagement with the upper surface of a rim of a tire on said table to clamp the rim to said table; means for moving said upper and lower bead breaking assemblies towards said bead breaking positions; and means whereby said hold down arms are moved to said clamping position before said lower bead breaking assembly is moved to its bead breaking position.

13. Apparatus according to claim 12 further including means mounting said table for rotation on said frame about an axis substantially parallel to said path; and a tire demounting and/or mounting tool movably mounted on said frame, said tool being mounted for selective movement toward and away from said table to permit its use on rims of varying types, said tool further being movable in said path for all positions of movement of the same relative to the frame whereby the beads on a tire may be broken and a tire mounted and/or demounted from a rim without removing the rim from the table and without adjusting the table position with respect to said path.

* * * * *